United States Patent
Hardy et al.

[19]

[11] Patent Number: 5,917,896
[45] Date of Patent: *Jun. 29, 1999

[54] BRIDGEABLE FAX MONITOR FOR HELP DESK SUPPORT

[75] Inventors: William Christopher Hardy, Dallas; Haroon I. Alvi, Allen; Bruce J. DeGrasse, Irving, all of Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/741,085

[22] Filed: Oct. 30, 1996

[51] Int. Cl.$^6$ .......................... H04M 11/00; H04M 1/24; H04N 1/00

[52] U.S. Cl. ...................... 379/100.05; 379/34; 358/406

[58] Field of Search ...................... 379/100.01, 100.03, 379/100.05, 100.06, 100.15, 106.01, 100.09, 1, 34, 211; 358/400, 406, 468

[56] References Cited

U.S. PATENT DOCUMENTS 4,626,630 12/1986 Waldman ................................ 379/211
5,299,257 3/1994 Fuller et al. ........................ 379/100.05
5,448,624 9/1995 Hardy et al. .............................. 379/34

Primary Examiner—Curtis A. Kuntz
Assistant Examiner—George Eng

[57] ABSTRACT

A method of and system for passively monitoring facsimile transmissions between an originating fax machine and a terminating fax machine. The system detects a ring signal from the originating fax machine on an inbound telephone line, and, in response to detecting the ring signal, dials the previously stored telephone number of the terminating fax machine on an outbound telephone line. Upon completion of dialing the telephone number of the terminating fax machine, the system establishes a connection between the inbound and outbound telephone lines, thereby to connect the originating and terminating fax machines. The system then passively monitors signals between the originating and terminating fax machines to display protocol information translated into human readable form and indications of signal level and quality.

14 Claims, 5 Drawing Sheets

5,917,896

BRIDGEABLE FAX MONITOR FOR HELP DESK SUPPORT

FIELD OF THE INVENTION

The present invention relates generally to telecommunications system equipment and services and more particularly to a method of and system for passively monitoring facsimile transmissions for help desk support.

DESCRIPTION OF THE PRIOR ART

Voice grade telephone lines are often used for transmitting facsimile data. Although there are many measures practiced to insure successful and error free transmission, many types of problems may still interfere with a given fax transmission. There may be electrical noise or distortion or echo on the phone line. Other problems may arise as either or both fax machines involved in the transmission are performing improperly in terms of signal levels, protocol adherence, noise rejection, etc. Unfortunately, fax machines do not provide the user an in-depth explanation of what has caused an attempted fax transmission to fail. Often, a frustrated fax user will assume the telephone network connection is at fault and will complain to the telephone service provider or at least solicit help in analyzing the problem.

Currently, there is no way that a telephone service provider help desk operator can be of much help in diagnosing facsimile transmission failures. It is therefore an object of the present invention to provide a method of and system for enabling help desk operators, and the like, to passively monitor facsimile transmissions between an originating fax machine and a terminating fax machine.

SUMMARY OF THE INVENTION

Briefly stated, the present invention provides a method of and system for passively monitoring facsimile transmissions between an originating fax machine and a terminating fax machine to enable a help desk operator or customer service representative to diagnose problems encountered by a customer in attempting to send a fax. The system detects a ring signal from the originating fax machine on an inbound telephone line, and in response to detecting the ring signal, dials the previously stored telephone number of the terminating fax machine on an outbound telephone line. Upon completion of dialing the telephone number of the terminating fax machine, the system establishes a connection between the inbound and outbound telephone lines, thereby to connect the originating and terminating fax machines. The system then passively monitors signals between the originating and terminating fax machines.

In monitoring the signals between the originating and terminating fax machines, the system measures and displays signal levels. The system also monitors and displays the quality of the signals, preferably by displaying constellation plots for the signals. The system also monitors the protocol status of the signals by translating protocol information into human readable form and displaying the translated protocol information for review by the help desk operator. The system also stores data collected during monitoring for later study and analysis.

The system preferably includes a first data access arrangement connected to the inbound telephone line. A data access arrangement is a direct connect telephone line interface device that generally performs ring detection, phone line control, and 2-wire to 4-wire hybrid functions. Data access arrangements include a receive terminal and a transmit terminal. The first data access arrangement performs ring detection in the present invention.

A second data access arrangement is also connected to the inbound telephone line. A third data access arrangement connected to the outbound telephone line. The second and third data access arrangements are connected to each other, transmit terminal to receive terminal.

The system includes a modem having a receive terminal and a transmit terminal. The transmit terminal of the modem is connected to the transmit terminal of the third data access arrangement to send dialed digits to the outbound telephone line. A relay is provided for disconnecting the first data access arrangement from the inbound telephone line and connecting the inbound telephone line to the receive terminal of the modem through a high impedance arrangement, so that the modem can receive signals transmitted between the originating and terminating fax machines.

The system includes a controller that controls and coordinates the functions of the components of the system. When the system detects a ring signal on the inbound telephone line, the controller causes the third data access arrangement to go off-hook. After the third data access arrangement has gone off-hook, the controller causes the modem to dial the telephone number of the terminating fax machine on the third data access arrangement. After the modem has finished dialing the terminating fax machine, the controller causes the relay to disconnect the first data access arrangement from the inbound telephone line and connect the inbound telephone line to the receive terminal of the modem. Also at the completion of dialing the telephone number of the terminating fax machine, the controller causes the second data arrangement to go off-hook, thereby to establish a connection between the inbound and outbound telephone lines. Preferably, the controller switches the relay and causes the second data access device to go off-hook between rings on the inbound telephone line, so as to protect the components from voltage surges.

DESCRIPTION OF THE PREFERRED EMBODIMENT

Figure 1A:
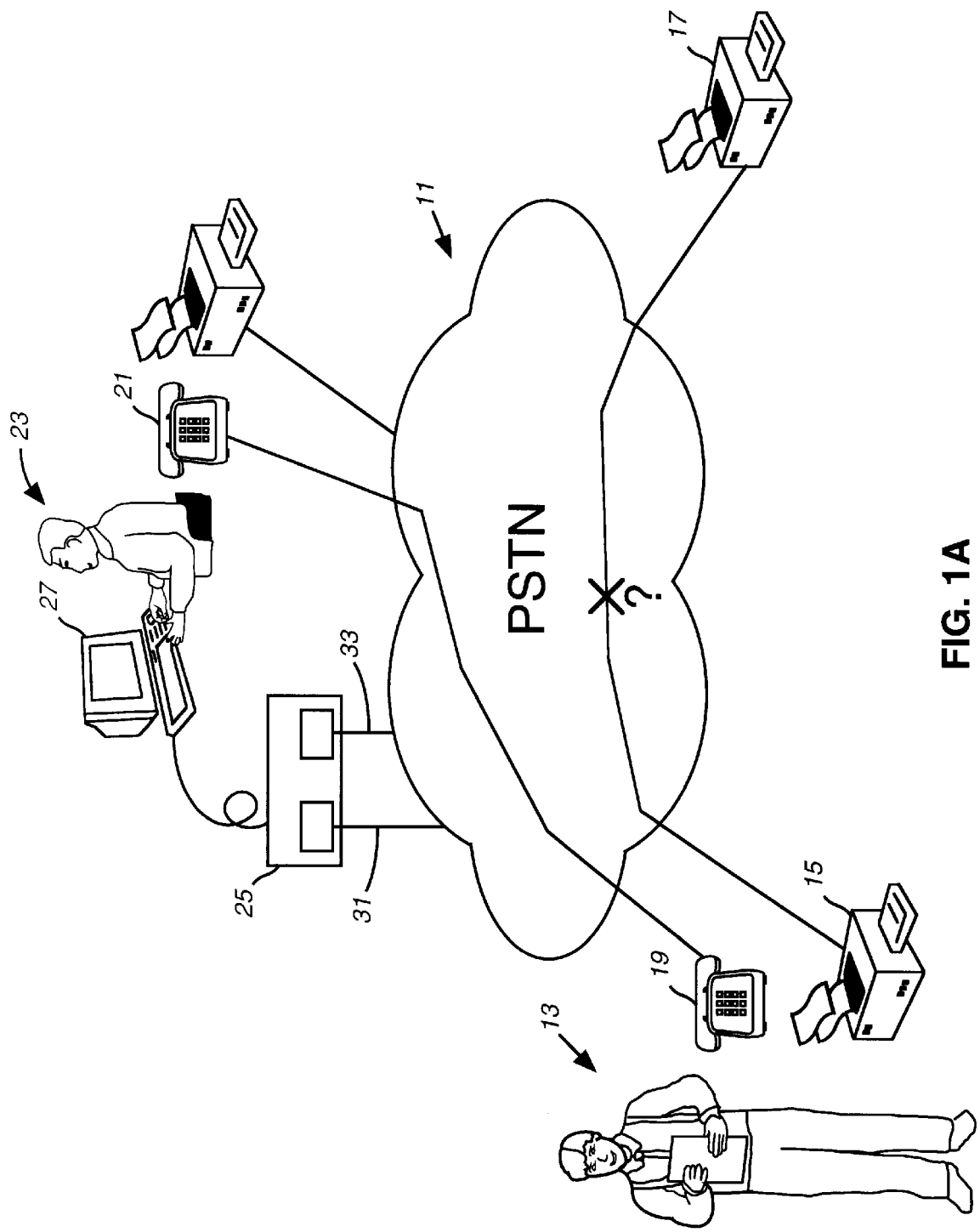
FIG. 1A is a pictorial representation of a system according to the present invention in a public switched telephone network environment.

Referring now to the drawings, and first to FIG. 1A, a public switched telephone network (PSTN) is designated generally by the numeral 11. PSTN 11 is adapted to connect calls between various pieces of telecommunications equipment, including telephones and fax machines. As shown in FIG. 1A, a fax originator 13 is attempting to send a fax from an originating fax machine 15 to a terminating fax machine 17 via PSTN 11. For some unknown reason, the attempted transmission is unsuccessful. Accordingly, fax originator 13 places a call from his telephone 19 to a telephone 21 of a customer service representative 23.

Although fax machines 15 and 17 are illustrated as being of the conventional type, including a scanner and a printer, it should be understood that in this disclosure fax machine includes any device adapted to send or receive facsimile data. For example, personal computers with fax cards or fax modems are included within the definition of fax machine.

After ascertaining that fax originator 13 is having trouble completing a fax transmission, customer service representative 23 gives fax originator 13 the telephone number of a bridgeable fax monitor 25 and asks fax originator 13 for the number of terminating fax machine 17. Customer service representative 23 then inputs the number of terminating fax machine 17 to bridgeable fax monitor 25 by means of a personal computer workstation 27 and instructs fax originator 13 to attempt to send the fax to bridgeable monitor 25.

Figure 1B:
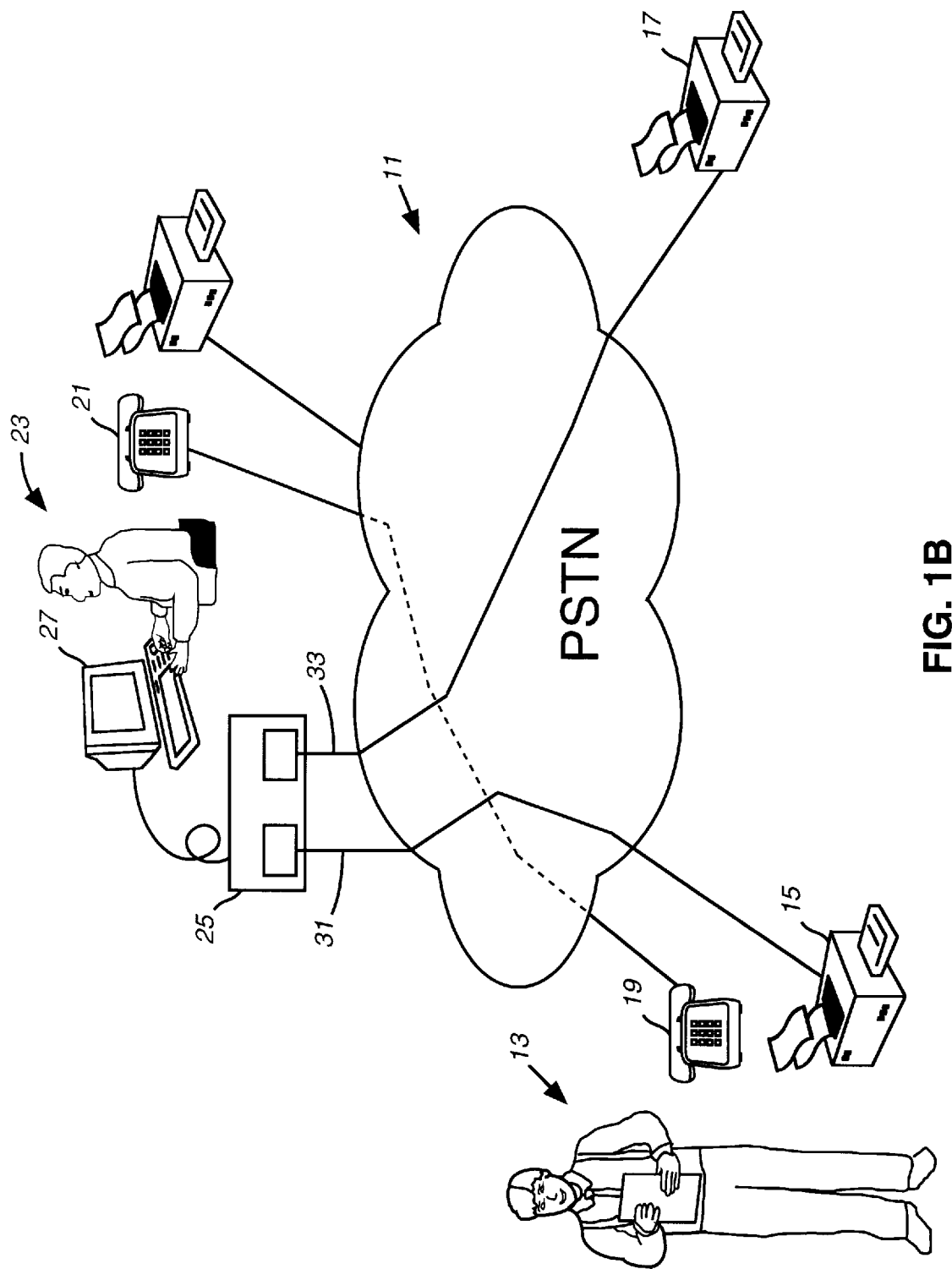
FIG. 1B is a pictorial representation similar to FIG. 1A showing the connection of the bridgeable fax monitor according to the present invention between an originating fax machine and a terminating fax machine.

Referring now to FIG. 1B, originating fax machine 15 is shown connected to terminating fax machine 17 through PSTN 11 across bridgeable fax monitor 25. As will be explained in detail hereinafter, bridgeable fax monitor 25 establishes a connection between originating fax machine 15 and terminating fax machine 17 and passively monitors the traffic passing back and forth between machines 15 and 17. Bridgeable fax monitor 25 is connected to workstation 27 thereby to store data collected during a session and enable customer service representative 23 to view displays of signal quality, protocol status, and the like. With the information displayed on workstation 27, customer service representative 23 can analyze and diagnose problems encountered in the attempted facsimile transmission. Fax originator 13 and customer service representative 23 may maintain their voice connection during the facsimile transmission through their respective telephones 19 and 21.

Figure 2:
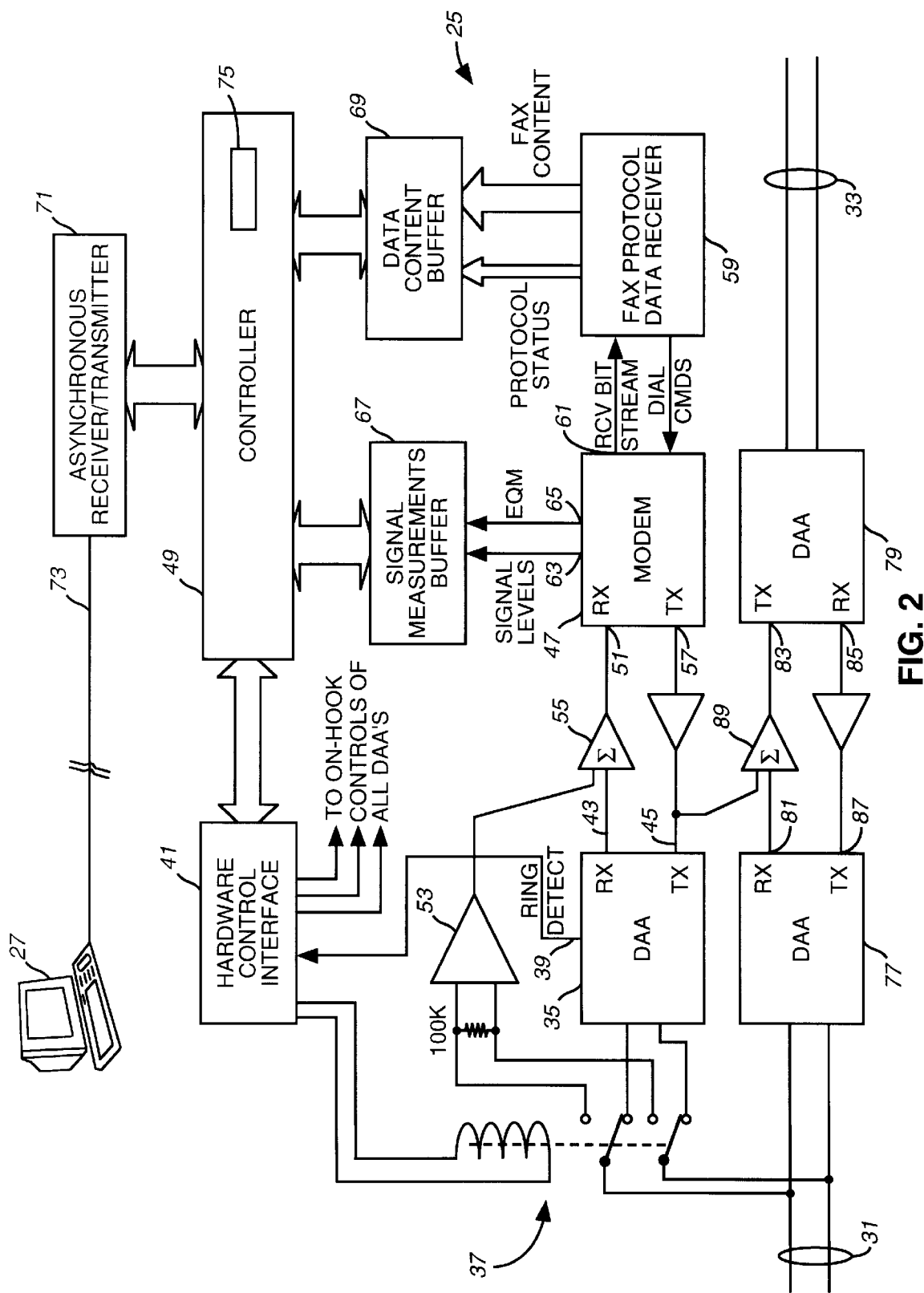
FIG. 2 is a block diagram of the bridgeable fax monitor system of the present invention.

Referring now to FIG. 2, bridgeable fax monitor system 25 of the present invention is adapted for connection between an inbound telephone line 31 and an outbound telephone line 33. Bridgeable fax monitor system 25 includes a first data access arrangement (DAA) 35 that is connected to inbound telephone 31 by a relay 37.

DAA 35 is a direct connect telephone line interface that provides ring detection, phone line control, and two-wire to four-wire hybrid functionality for bridgeable fax monitor system 25. In the preferred embodiment, DAA 35 is a model CH1840 manufactured by Cermetek Microelectronics, Sunnyvale, Calif.

As shown in FIG. 2, DAA 35 includes a ring detect output 39 that is connected to a hardware control interface 41. DAA 35 also includes a receive connection 43 and a transmit connection 45. Connections 43 and 45 are connected to a modem 47. However, in system 25, DAA 35 serves only to detect a ring signal on inbound line 31 and does not go off-hook. Accordingly, in normal operation, DAA 35 does not transmit data to or receive data from modem 47.

Hardware control interface 41 is adapted to receive ring detect signals from DAA 35, send on-hook/off-hook control signals to all DAAs of system 25, including DAA 35, and energize/deenergize relay 37. Hardware control interface 41 sends signals to and receives signals from a controller 49. Controller 49 is a programmable device that performs various control and data processing functions in system 25, as will be explained in detail hereinafter.

Relay 37 is operable by means of hardware control interface 41 to disconnect DAA 35 from inbound telephone line 31 and connect inbound line 31 to the receive terminal 51 of modem 47. The connection between inbound line 31 and modem 47 is established through a high impedance differential amplifier 53 and a summing amplifier 55. Thus, when relay 37 is energized, modem 47 can passively monitor the signals on inbound telephone line 31.

In the preferred embodiment, modem 47 is a Rockwell R144EFXL Monofax® synchronous 14400 bits per second (bps) half-duplex modem with error detection and DTMF reception. The preferred modem can operate over the public switched telephone network (PSTN) through line terminations provided by data access arrangements, such as DAA 35.

Modem 47 includes, in addition to receive terminal 51, a transmit terminal 57. Modem 47 includes a dual tone generator that allows modem 47 to receive dial commands from a fax protocol data receiver unit 59, and thereby operate as a programmable DTMF dialer.

Modem 47 is adapted to convert signals received at receive terminal 51 to a receive data bit stream, which it sends to fax protocol data receiver 59 at output 61. In addition to the output receive data bit stream, modem 47 outputs signal measurement data, including signal levels at output 63 and eye quality measures (EQM) at output 65.

Signal level output 63 provides a measure of the level of the signal received at receive terminal 51. EQM output 65 provides signals necessary to create a display of the receive baseband constellation plots. By observing a constellation plot, common line disturbances can usually be identified. EQM output 65 includes two serial bit streams containing data for the display in the X-axis and Y-axis of a constellation plot. The constellation plot produced depends upon the configuration of the signal received. For example, V.33/V.17 at a data rate of 14400 bps uses trellis coded modulation and produces 128 constellation points, whereas V.29 at a data rate of 9600 bps uses quadrature amplitude modulation and produces 16 trellis points.

Signal levels and EQM are received in a signal measurement buffer 67, which communicates with controller 49. Protocol status and fax content from fax protocol data receiver 59 are stored in a data content buffer 69, which also communicates with controller 49.

Controller 49 is a programmable device that receives signals from hardware control interface 41, signal measurements buffer 67, and data content buffer 69. Controller 49 is programmed to cause hardware control interface 41 to send on-hook/off-hook signals to the DAAs it controls. Controller 49 also constructs a serial output data stream from the contents of signal measurement buffer 67 and data content buffer 69, which it sends through an asynchronous receiver/transmitter 71 to workstation 27 on a serial data link 73. Controller 49 also receives data from workstation 27 through serial data link 73 and asynchronous receiver/transmitter 71, including terminating fax machine telephone numbers, which it stores at 75.

System 25 includes a second DAA 77 connected to inbound telephone line 31, and a third DAA 79 connected to outbound telephone line 33. DAAs 77 and 79 are preferably of the same type as DAA 35. DAA 77 includes a receive terminal 81 that is connected to a transmit terminal 83 of DAA 79. Similarly, DAA 79 includes a receive terminal 85 that is connected to a transmit terminal 87 of DAA 77. Thus, when DAAs 77 and 79 are both off-hook, they serve to connect inbound telephone line 31 with outbound line 33. Transmit terminal 83 of DAA 79 is also connected to transmit terminal 57 of modem 47 through a summing amplifier 89, so that DTMF tones may be placed on outbound telephone line 33.

Figure 3:
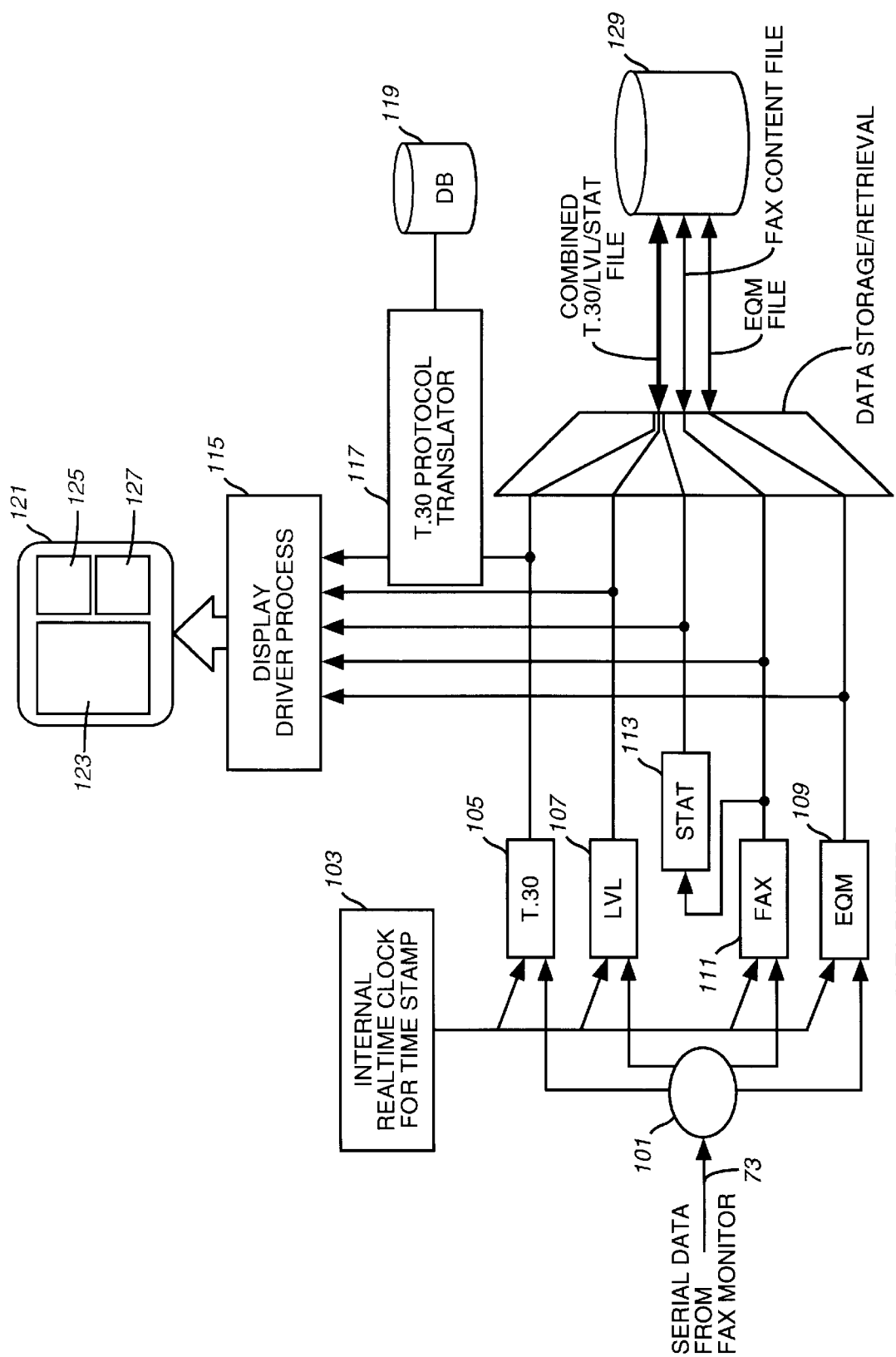
FIG. 3 is a block diagram of the fax monitor work station according to the present invention.

Referring now to FIG. 3, there is shown a functional diagram of workstation 27. Serial data from fax monitor system 25 is received on serial data link 73 at a data separator 101. Data separator 101 parses the data stream formed by controller 49 and places the parsed data into appropriate buffers along with a time stamp from an internal real time clock 103. The data buffers include a T.30 buffer 105, for containing protocol information. The data buffers also include a level buffer 107 for containing signal level data and an EQM buffer 109 for containing signal quality data. Finally, the data buffers include a fax data buffer 111 for receiving the actual content of the facsimile transmission and a statistics buffer 113 for receiving statistics on the transmission.

The contents of the data buffers are fed to appropriate display drivers, shown generally at 115. The contents of T.30 buffer 105 are sent to display driver 115 through a protocol translator 117. Protocol translator 117 translates T.30 messages into human readable form with the aid of a database 119 that maps user oriented messages to T.30 events. In the preferred embodiment, database 119 is user editable so that the customer service representative can write messages that may be more meaningful to him or her.

Workstation 27 includes a display 121. Display 121 is shown in FIG. 3 in a real time mode, in which translated T.30 status messages are displayed in a first window 123, constellation plots indicating signal quality are displayed in a second window 125, and signal level data are displayed in a third window 127. Display 121 is also adapted to run in a second mode in which stored data may be viewed.

In addition to real time display, the contents of the data buffers are stored in storage 129. In the preferred embodiment, fax content from fax buffer 111 is stored in a fax content file, so that the fax may be viewed on display 121. The contents of EQM buffer 109 are stored in a separate EQM file that is identified by time stamp and fax page number. The EQM file is useful in diagnosing time dependent transmission problems. Finally, the contents of T.30 buffer 105, level buffer 107, and statistics buffer 113 are stored in a combined file that provides the customer service representative with useful information.

Figure 4:
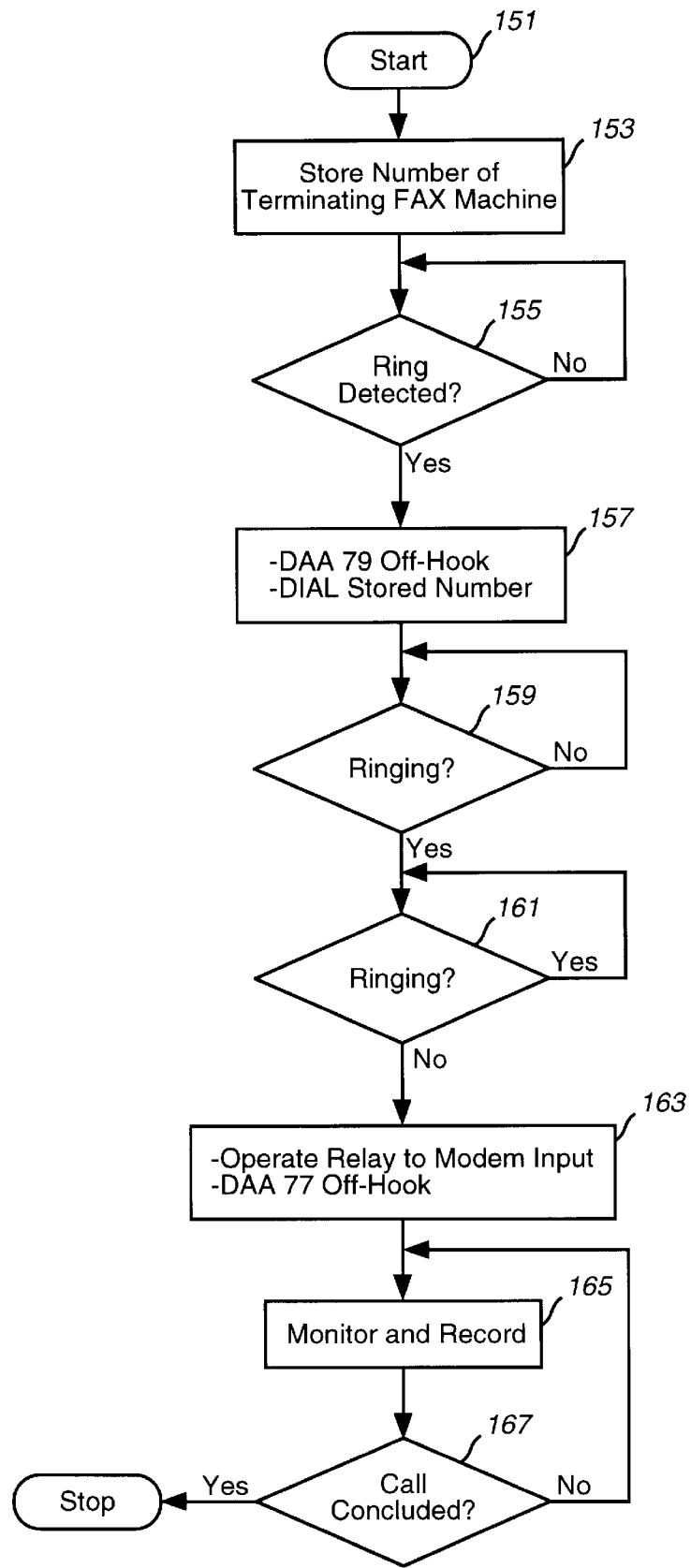
FIG. 4 is a flow chart showing the high level logic of the method of the present invention.

The operation of the system of the present invention may be best understood with reference to the flow chart of FIG. 4, which primarily shows the processing that occurs in controller 49. The process starts at 151 and the system is initialized by clearing buffers 67 and 69, placing DAAs 35, 77 and 79 on-hook, and deenergizing relay 37, thereby to connect DAA 35 to inbound telephone line 31. Then, the telephone number of the terminating fax machine is stored at block 153. After the telephone number of the terminating fax machine has been stored, the system waits at decision block 155 until a ring is detected at DAA 35.

When a ring is detected at decision block 155, controller 49 directs hardware control interface 41 to cause DAA 79 to go off-hook, at block 157. Also at block 157, controller 49 directs modem 47 to dial the stored number of the terminating fax machine.

After the system has completed dialing the number of the terminating fax machine, the system waits at decision block 159 for a ring to be detected on inbound line 31 at DAA 35. When the system detects a ring at decision block 159, the system then waits at decision block 161 for the ring to complete. When the ring on inbound telephone line 31 is complete, at block 161, the system operates relay 37 to connect inbound telephone line 31 to modem 47 through high impedance differential amplifier 53 and causes DAA 77 to go off-hook, at block 163. By waiting, at decision block 161 for the conclusion of a ring, the system protects system components from damage that might be caused by voltage surges involved in going off-hook in the middle of a ring.

After DAA 77 goes off-hook, inbound telephone line 31 and outbound telephone line 33 are effectively interconnected. The system then monitors and records the traffic in both directions between the originating fax machine and the terminating fax machine, as indicated generally at block 165. The system continues to monitor and record until the call is concluded, at decision block 167.

From the foregoing, it may be seen that the method and system of the present invention provide a mechanism by which fax transmissions may be monitored and analyzed at a location remote from either the originating or terminating fax machine. The system monitors the transmissions passively, so as not to correct failures caused by the fax machines or the network, and not to introduce additional sources of failure. The system can detect not only problems caused by the fax machines, but also those caused by the network. Thus, the system can provide valuable information to the fax customer and to the owner of the network as well.

What is claimed is:

1. A system for monitoring facsimile transmissions from an originating fax machine to a terminating fax machine, said terminating fax machine being identified by a telephone number, said system comprising:

a first telephone interface connected to an inbound telephone line, said first telephone interface including means for detecting a ring signal from said originating fax machine on said inbound telephone line;

a second telephone interface connected to an outbound telephone line and to said first telephone interface, and wherein said first telephone interface further includes a first data access arrangement connected to said inbound telephone line for detecting said ring signal on said inbound telephone line, and a second data access arrangement connected to said inbound telephone line and to said second telephone interface, said second data access arrangement including means for going off-hook;

means for causing said second telephone interface to go off-hook and dial said telephone number of said terminating fax machine on said outbound telephone line in response to detecting said ring signal;

means for causing said first telephone interface to go off-hook after completion of dialing said telephone number of said second telephone interface to establish a connection between said inbound and outbound telephone lines, thereby connecting said originating and terminating fax machines; and means for passively monitoring signals between said originating and terminating fax machines.

2. The system as claimed in claim 1, wherein said means for establishing a connection between said inbound and outbound telephone lines includes a third data access arrangement connected to said inbound telephone line and to said second data access arrangement.

3. The system as claimed in claim 1, wherein said means for dialing said terminating fax machine includes a modem connected to said second data access arrangement.

4. The system as claimed in claim 1, wherein said means for passively monitoring signals between said originating and terminating fax machines includes:

a modem; and, means for connecting said modem to said inbound telephone line.

5. The system as claimed in claim 1, including:

means for disconnecting said first data access arrangement from said inbound telephone line substantially simultaneously with causing said second data access arrangement to go off-hook.

6. The system as claimed in claim 5, wherein said means for passively monitoring signals between said originating and terminating fax machines includes a modem including a transmit terminal and a receive terminal, said transmit terminal being connected to a transmit terminal of said second telephone interface.

7. The system as claimed in claim 6, including means for connecting said receive terminal of said modem to said inbound telephone line substantially simultaneously with disconnecting said first data access arrangement from said inbound telephone line.

8. A system for monitoring facsimile transmissions from an originating fax machine to a terminating fax machine, said terminating fax machine being identified by a telephone number, which comprises:

- a first data access arrangement connected to an inbound telephone line, said first data access arrangement including means for detecting a ring on said inbound telephone line;
- a second data access arrangement connected to said inbound telephone line, said second data access arrangement having a transmit terminal and a receive terminal;
- a third data access arrangement connected to an outbound telephone line, said third data access arrangement having a transmit terminal connected to the receive terminal of said second data access device, and said third data access device having a receive terminal connected to the transmit terminal of said second data access device;
- a modem having a receive terminal and a transmit terminal, said transmit terminal being connected to said transmit terminal of said third data access arrangement;
- relay means for disconnecting said first data access arrangement from said inbound telephone line and connecting said inbound telephone line to said receive terminal of said modem; and,
- a controller, said controller including:
    - means for causing said third data access arrangement to go off-hook in response to detection of a ring signal at said first data access arrangement;
    - means for causing said modem to dial the telephone number of said terminating fax machine in response to detection of a ring signal at said first data arrangement;
    - means for operating said relay to disconnect said first data access arrangement from said inbound telephone line and connect said inbound telephone line to said receive terminal of said modem in response to detection of a ring signal at said first data arrangement; and,
    - means for causing said second data arrangement to go off-hook at the completion dialing the telephone number of said terminating fax machine, thereby to establish a connection between said inbound and outbound telephone lines.

9. The system as claimed in claim 8, including:

a signal measurements buffer adapted to receive signal level data and EQM data from said modem; and, a fax protocol and data receiver adapted to receive a received bit stream from said modem.

10. The system as claimed in claim 9, wherein said controller includes means for forming a serial bit stream from data received from said signal measurements buffer and said fax protocol and data receiver.

11. The system as claimed in claim 10, including:

a personal computer workstation;

an asynchronous transmitter/receiver adapted to receive said serial bit stream from said controller; and, a serial data link connecting said personal computer workstation and said asynchronous transmitter/receiver.

12. The system as claimed in claim 11, wherein said personal computer workstation includes:

means for parsing said serial bit stream into data components;

means for storing selected ones of said data components; and, means for displaying selected ones of said data components.

13. The system as claimed in claim 12, wherein said means for displaying selected ones of said data components comprises a means for providing a natural language description of the content of said data components from said data protocol receiver.

14. The system as claimed in claim 12, wherein said means for parsing said serial bit stream into data components comprises a means for displaying and facilitating the interpretation of said data components from said signal measurements buffer and data receiver.

\* \* \* \* \*